US008448530B2

(12) United States Patent
Leuenberger et al.

(10) Patent No.: US 8,448,530 B2
(45) Date of Patent: May 28, 2013

(54) ROLL-TO-ROLL COMPATIBLE PRESSURE SENSITIVE EVENT SENSING LABEL

(75) Inventors: David Leuenberger, Basel (CH); Guillaume Basset, Basel (CH); Tilman Beierlein, Thalwil (CH)

(73) Assignee: CSEM Centre Suisee d'Electronique et de Microtechnique SA-Recherche et Developpement, Neuchatel (CH)

(*) Notice: Subject to any disclaimer, the term of this patent is extended or adjusted under 35 U.S.C. 154(b) by 161 days.

(21) Appl. No.: 12/732,600

(22) Filed: Mar. 26, 2010

(65) Prior Publication Data
US 2010/0242629 A1 Sep. 30, 2010

Related U.S. Application Data

(60) Provisional application No. 61/163,984, filed on Mar. 27, 2009.

(51) Int. Cl.
*G01L 1/10* (2006.01)
(52) U.S. Cl.
USPC .................................. 73/862.625; 73/760
(58) Field of Classification Search
USPC ................ 73/762, 780, 862.625–862.626
See application file for complete search history.

(56) References Cited

U.S. PATENT DOCUMENTS

| 3,662,105 | A | | 5/1972 | Hurst et al. | |
|---|---|---|---|---|---|
| 3,798,370 | A | | 3/1974 | Hurst | |
| 3,894,243 | A | * | 7/1975 | Edelman et al. | 307/400 |
| 4,659,090 | A | * | 4/1987 | Kustanovich | 273/376 |
| 4,755,274 | A | * | 7/1988 | Mase et al. | 204/427 |
| 4,931,782 | A | * | 6/1990 | Jackson | 345/174 |
| 4,965,421 | A | * | 10/1990 | Epperson | 200/514 |
| 5,060,527 | A | * | 10/1991 | Burgess | 73/862.68 |
| 5,317,919 | A | * | 6/1994 | Awtrey | 73/718 |
| 5,451,724 | A | * | 9/1995 | Nakazawa et al. | 178/18.05 |
| 5,810,742 | A | * | 9/1998 | Pearlman | 600/547 |
| 6,645,675 | B1 | * | 11/2003 | Munshi | 429/305 |
| 7,511,702 | B2 | * | 3/2009 | Hotelling | 345/173 |
| 7,663,607 | B2 | * | 2/2010 | Hotelling et al. | 345/173 |
| 7,741,175 | B2 | * | 6/2010 | Miller et al. | 438/251 |
| 7,811,679 | B2 | * | 10/2010 | Aziz et al. | 428/690 |
| 2006/0145401 | A1 | * | 7/2006 | Mihara et al. | 264/618 |
| 2008/0001737 | A1 | | 1/2008 | Metry | |
| 2008/0048215 | A1 | * | 2/2008 | Davies | 257/274 |

FOREIGN PATENT DOCUMENTS

| WO | 2007077224 A2 | 7/2007 |
|---|---|---|
| WO | 2008000479 A1 | 1/2008 |

* cited by examiner

*Primary Examiner* — Max Noori
(74) *Attorney, Agent, or Firm* — A.C. Entis-IP Ltd.

(57) ABSTRACT

The present invention discloses a smart label to be affixed on or integrated in an object and able to provide an electrical signal indicative of the applied pressure or force and/or the position of the applied pressure or force at a touch point on the object to which the label is affixed. The smart label comprises a layer structure and a detector system, the layer structure comprising of at least a stack of a first, a second and a third layer. The first and third layers comprise a flexible, electrically conductive or semiconductive material and at least two electrodes for connecting the layers to the detector system. The second layer comprises a flexible, deformable and compressible material. The second layer is electrically nonconductive or electrically conductive but less conductive than the first and third layers, wherein the second layer separates the first and third layers.

16 Claims, 16 Drawing Sheets

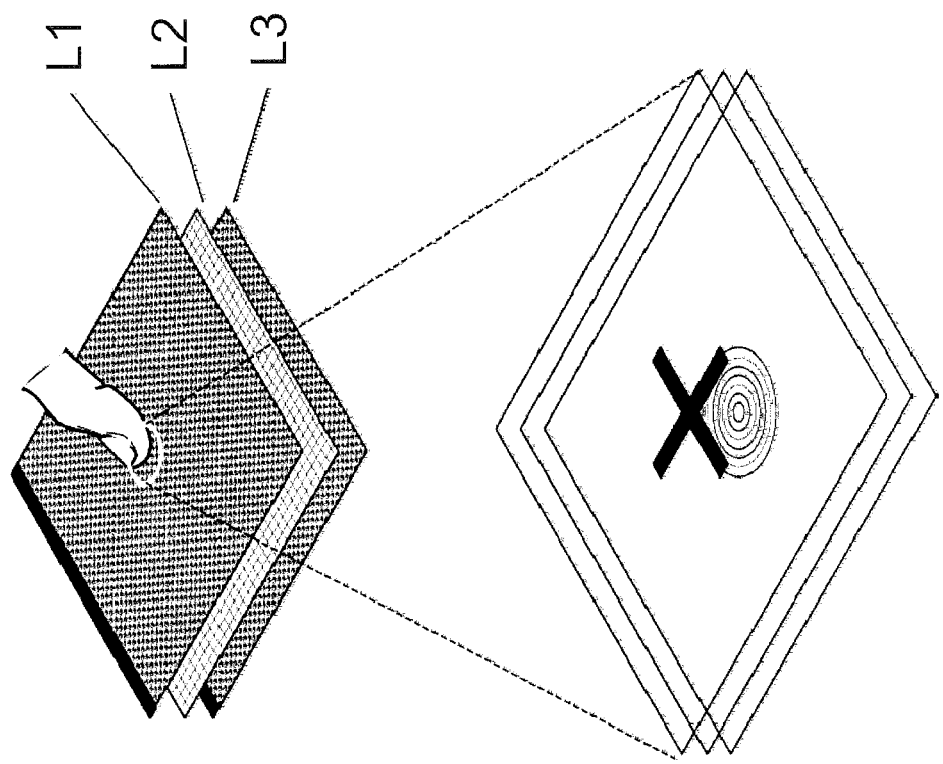
FIG. 14
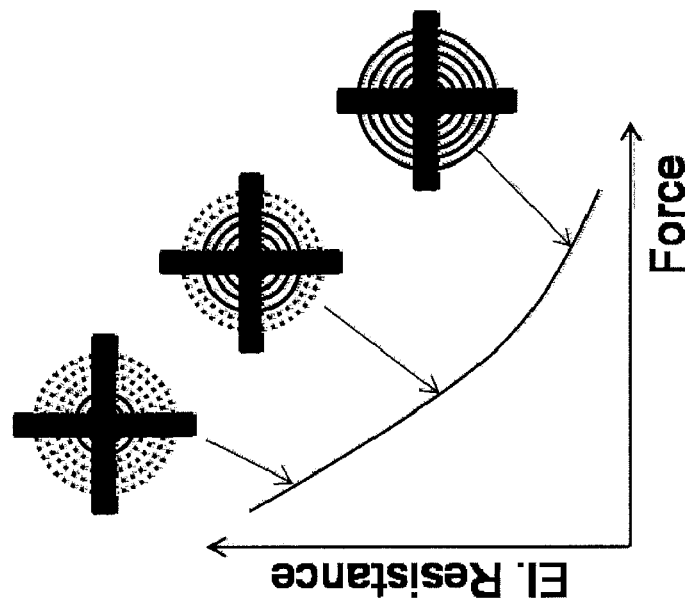

ROLL-TO-ROLL COMPATIBLE PRESSURE SENSITIVE EVENT SENSING LABEL

CROSS-REFERENCE TO RELATED APPLICATIONS

This Patent Application claims priority from U.S. Provisional Application 61/163,984 filed on Mar. 27, 2009, the disclosure of which is incorporated herein by reference in its entirety.

FIELD OF THE INVENTION

The present invention relates to a smart label, in more detail to a pressure sensitive event sensing label. The invention relates further to transparent or semi-transparent types of such smart labels. The smart label can provide an electrical signal indicative of the status of the object to which the label is affixed. In one embodiment it relates to the use of such labels in connection with dispensers of unit dose medications having a desired dispensing regimen. In particular the invention relates to systems to sense with smart labels medication events with such dispensers. In one embodiment such labels gather process information on patient compliance with the desired dispensing regimen. In a different embodiment the smart label is used in conjunction with an alarm clock function with the purpose to remind the patient to take his medication on time.

BACKGROUND OF THE INVENTION

The use of smart labels that can be placed on top of unit dose medication blisters are known in the art and described in WO 2008000479 (A1) and WO 2007077224 (A2).

The first document discloses a label which notes the manipulation of objects which it labels by generating an altered electrical signature is provided. The label comprising a stack of layers and an adhesive coating, the stack of layers comprising first, second and third layers, the first and third layers each comprising flexible, conformable, electrically conductive or semiconductive material and each comprising an electrical contact point for connection into an electrical circuit, the second layer comprising a flexible, deformable and compressible material, said second layer being electrically nonconductive or electrically conductive but less conductive than the first and third layers, said second layer separating said first and third layers, with the adhesive coating being suitable for attaching the stack of layers to the object.

WO 2007077224 teaches how to build improved systems for monitoring patient compliance with medication regimens. The systems note when unit doses of medication are dispensed to a patient and include a detector for generating a signal each time a unit dose is dispensed as well as a signal processor which can act upon the signal. The devices include a flexible conductive substrate physically supporting and connecting the detector and the processor into a unitary structure and conducting the signal from the detector to the processor. In embodiments the flexible conductive substrate employs flexible conductive organic materials.

The basics of touch pads are also very well known in the art and described for example in U.S. Pat. Nos. 3,662,105 and 3,798,370. The first document discloses an inexpensive electrical sensor of plane coordinates that employs juxtaposed sheets of conducting material having electrical equipotential lines extending across each sheet and arranged normal to each other. A probe upon touching each sheet at a selected intersection of the equipotential lines causes separate signals to be applied to one or more conventional information-indicating units.

DESCRIPTION OF THE INVENTION

Summary of Embodiments of the Invention

The invention discloses a smart label to be affixed on or integrated in an object. In embodiments, the smart label is operative to provide an electrical signal indicative of at least one of the following: the applied pressure, the applied force, the position of the applied pressure, the position of the applied force, at a touch point on the object to which the label is affixed. The smart label includes a layer structure and a detector system. The layer structure includes at least of a stack of a first, a second and a third layer, the first and third layers each comprising a flexible, electrically conductive or semiconductive material and at least two electrodes for connecting the layers to the detector system, wherein the second layer comprises a flexible, deformable and compressible material, the second layer being electrically nonconductive or electrically conductive but less conductive than the first and third layers, the second layer separating the first and third layers, and wherein the at least two electrodes from the first and third layers are arranged along one side of the layer structure.

In embodiments, the layer structure is fabricated in a roll-to-roll, or reel-to-reel or sheet-to-sheet process.

In embodiments, the detector system comprises of an electronics and an electrical power supply, one or both of the latter being integrated into or attached to the layer structure.

In embodiments, the first, second and third layers are transparent or semi-transparent.

In embodiments, the first and the third layers have a gradient of conductivity in at least one of a vertical and horizontal direction.

In embodiments, the position of the applied pressure or force at a touch point is provided as X-Y coordinates, wherein the X-Y coordinates are deduced from a sequence of analog resistance signal measurements between predetermined groups of said electrodes.

In embodiments, the second layer is a non-conductive spacer grid with air voids.

In embodiments, at least one of the first and the third layer comprises a microstructure so as to obtain a more linear resistance vs. force relationship at a touch point.

In embodiments, the first and second layer comprise a moderately conductive material and wherein the first layer comprises a pattern of highly conductive crosses and the third layer comprises a pattern highly conductive concentric circles, the patterns of crosses and circles being aligned to each other so as to obtain a more linear resistance vs. force relationship at a touch point.

In embodiments, the smart label can be customized in size by a simple cutting process.

In embodiments, the smart label is monolithically integrated into a package, especially in a blister package.

DETAILED DESCRIPTION OF THE INVENTION

The present invention will be described in more detail below. It is understood that the various embodiments, preferences and ranges as provided/disclosed in this specification may be combined at will. Further, depending of the specific embodiment, selected definitions, embodiments or ranges may not apply.

There are numerous settings where it is advantageous to have an indication of the status of an object. For example, there are settings where it is of importance to know if an object is intact or if it has been tampered with or accessed, and the time at which the tampering or access occurred. These settings include security labeling or tamper-proof packages for foods or beverages or pharmaceuticals. It is possible to incorporate devices which will provide this security and this information directly into the packaging for the objects. However, there are many times when it is inconvenient to do this or where a variety of different packaging is presented such that a great variety of devices would be needed to accommodate the range of packages.

In the field of pharmaceuticals there is a growing appreciation that monitoring the timelines and consistency of medication administration can lead to better patient compliance with desired dosing plans and to a better understanding of the drug's effectiveness on a patient-by-patient basis. Today, this sort of information is gathered and stored electronically in virtually all cases. In these settings there is a need to have an easy-to-use type of detector to note the drug dispensing events. It is also helpful if that detector can be relatively universal and readily adapted to detect dispensing from a range of drug containers and drug presentation formats. It should also be simple of construction and robust and not prone to the generation of "false positive" dose detection errors in which a false indication of dosing is generated. The present invention satisfies all of these needs.

There is a special interest in the application of this invention to the field of pharmaceuticals and the assurance of the purity and proper administration of drug dosage forms. However, this invention can find application far beyond this field.

It is a principal object of this invention to provide a smart label capable of providing a changed electrical signal as a function of whether or not or how many times an object labeled with the label has been physically accessed or otherwise manipulated. If several objects are packed together in one package the label according to this invention can even detect which of the objects has been accessed or manipulated. According to embodiments of the invention, the smart label is transparent or semi-transparent.

It is an additional object to provide a system including such a label. The system can sense and employ information about whether or not or how many times an object labeled with the label has been accessed or otherwise manipulated.

It is an additional object to provide such a label and such a system which can be employed in medication compliance monitoring systems.

A further object of the invention is to provide such a label and system incorporating this label which can be employed in improved medication compliance monitoring systems that can gather data concerning patient dosing of medications. Further such systems may store and optionally communicate the data concerning stored medication dosing events.

Thus, in one aspect this invention enables an electrical-signal-providing label for attachment to an object such as a container or blister. The label is suitable for detecting one or more manual events, such as physical accessing involving the object. Further this invention enables a system including such a label for using the detection of the event that the label provides. The label includes a stack of layers and an adhesive coating. It may also include a disposable protective layer over the adhesive coating that is removed prior to affixing the label to the object. The stack of layers includes at least three layers. The first layer is a flexible, conformable layer. It is made of or coated with an electrically conductive or semiconductive material. The second layer is made of a flexible, deformable, and compressible material. This second layer may be non-conductive or it may be electrically conductive. Further it is less conductive than the first layer. The third layer is typically similar to or like the first layer. It is flexible and conformable. Further it is made of or contains a coating of flexible, conformable, electrically conductive or semi conductive material. The second layer physically and electrically separates the first and third layer. It acts as a spacer layer. Upon the application of a force or pressure a characteristic electrical response or signature for the three layer stack is measureable. This response varies if and when the second layer is deformed or compressed. This electrical "signature" is an electrical resistance value measured across the first and third layers and the intermediate second layer. Typically the response is measured with and without deformation or compression. The first and third layers each have at least one electrical contact point to which electrical connection can be made. The purpose of these connections is to detect at least one of the following: the electrical signature the variations in it measured across the three layers. Variations of the signature occur when the object to which the label is affixed undergoes manipulation or access and the second layer is deformed or compressed.

In one embodiment the second layer is completely resilient. If the intermediate second layer is completely resilient such that it returns to its original configuration after manipulation or deformation, then the response should essentially return to its original value, as well. In this case, if multiple events are being detected, they may each present a similar signature from the baseline signature value. This will result in a change in response which is not additive as multiple events are detected. In one embodiment the second layer is not completely resilient. If, however, the second layer is not completely resilient such that it does not essentially completely return to its configuration after manipulation or deformation each successive deformation or compression may produce a change in response. This response is, at least in part, additive with the original value and thus distinguishable from the initial change in response.

The sensitivity of the label with respect to the applied pressure is basically given by the mechanical properties of the multi-layer system in general and the mechanical properties of the second or spacer layer in particular. The electrical response also depends on the form and texture of the supporting surface. In many cases it is desirable to have a 'generic' label that can be fabricated in large quantities in a roll-to-roll compatible fabrication process. The pressure sensitive label described in this invention provides an electrical signal that depends on the amount of applied pressure. In one category of the invention the total resistance measured between the two conductive layers 1 and 3 depends on the cursor position where the two layers are brought in contact. In a separate category of the invention the label is structured in such a way that the total resistance depends only on the applied pressure independent of the position on the label. This latter category has the advantage of easier read-out for applications where no spatial resolution is desired. Furthermore the electrical response is analog rather than digital. The analog response has the advantage that the identical label can be applied to a wide range of different surfaces with different mechanical properties. Further is can be used for the detection of a multitude of events. The sensitivity of the device can then be set electronically by means of a threshold value. The chance of an unwanted electrical short ruining the detection is also mitigated, since in that case only the detection baseline is modified and the label can still be operated.

In the case of a digital response in the sense of contact/no-contact a multitude of different labels with different electromechanical properties has to be fabricated. An integral part of the invention is the fact that the label can be cut from the roll to arbitrary length perpendicular to the roll direction. Both, bottom and top, conducting layer can be contacted from the same side.

A further aspect of the invention is to achieve a more linear electrical response function with respect to applied pressure. This can be achieved by micro-structuring one or both conductive layers.

In some embodiments of the invention it will be desired to detect a series of several events occurring over an area. It may be desired to identify which of the several events is being detected. This could occur, for example, if one were detecting the delivery of a series of doses of two or more drugs from a single membrane type array such as found with oral contraceptives. By having more than one electrode being connected to each of the conductive layers, it is possible to detect both the applied pressure and the X-Y coordinates of the touch point. The position is deduced from the analog resistance signal measured between the different electrodes. It does not require complicated pixelization leading to time-consuming and complex electrical connections over the whole label area.

The label includes according to an embodiment of the invention an adhesive coating which is suitable for adhering the label made up of the stack of layers to the object. Alternatively the label may be laminated to the object. Still another possibility to affix the label to the object is to mechanically fix it. In still a further embodiment the label can be integrated into an object. The label can be monolithically integrated in the object. One possible way to integrate the label is by a thermoforming process. For example the smart label can be fabricated as a composite foil which subsequently can be thermoformed in a package. An example of such a package is a blister package. Typically the label is adhered in a location selected to receive a second-layer-deforming or compressing force when the object is accessed or otherwise manipulated. This adhesive is commonly a pressure sensitive adhesive such as a polyolefin or polyacrylate. It can be present with or without a substrate or backing layer. A substrate, if present, can be formed of common flexible film-forming structural polymers. Examples are PET poly(ethylene terephthalate) and other polyesters, olefin polymers such as PE polyethylene, aromatic polymers such as PS polystyrene and the like.

This label can be combined with an electrical detection circuit which detects variations in the electrical signature of the label. In one representative embodiment this circuit can feed a first fed electrical signal across the first and third layers. The circuit can then detect a first output signal across the first and third layers with the label in place attached to the object. Typically this is done before access to the object has been achieved. This provides a base electrical value for the signature which the detection circuit can read. Thereafter the circuit feeds a second fed electrical signal across the first and third layers with the label in place and detects a second output signal across the first and third layers. The first and second output signals are the same or at least similar to each other if no access to the object has been achieved. The first and second output signals differ from one another in a characteristic way if the second layer is being or has been compressed or deformed as a result of the object having been manipulated or accessed. The circuit can include processors, indicators, memories, data transmitters and the like. These components of the circuit can gather, store, and display or transmit information concerning manipulation or accessing of the object based upon the detected similarities or differences between the first and second output signals provided by these labels.

According to an embodiment, this invention provides an electrical-signal-providing label system for detecting the dispensing of one or more doses of medication from a container to a patient. In this aspect the label as just described is suitably associated with, e.g. adhered to, a medication dose container. Alternatively it can be a part of the packaging for the dose or doses of medication. The label is located such that proper manipulation of the medication container will provide the needed second-layer compressing or deforming force which alters the electrical signature. Examples for proper manipulations are the opening or opening and closing of the container, the working of a child-proof closure, the pushing of a lever to actuate an inhaler or the "bursting" of a pill from a "blister pack" or other flat format packaging. If located at the right position the label provides the indication of accessing or other manipulation of the medication dispenser. In most applications, the label is affixed to the container or packaging at this desired operative location. It will be appreciated that it is desirable to choose the location for the label to maximize the detection of actual accessing or manipulation events and to minimize the detection of spurious events.

In a further aspect the label of this invention can detect a series of accessing or manipulation events involving an object or a series of objects. In this case the label can remain as just described. The detection circuit can remain essentially the same, as well. In this case, the label is placed on the object in a location selected to receive a second-layer-compressing or distorting force each time the object is accessed and the electrical detection circuit is capable of gathering information in the form of a series of electrical signals. In this case, each time the object is accessed or manipulated, additional second-layer-compressive or distortive forces are applied to the second layer. Consequently the output signal (i.e. electrical signature of the label) is altered in a characteristic manner or in characteristic manners. These characteristic signals can be detected and used as a record of the one or more accessing or manipulations. In some embodiments, this can be used to detect the delivery of a series of doses of a medication. The accessing of different objects can give rise to different signatures. Accordingly, in this aspect, it may be advantageous to employ a detection circuit which can distinguish among the different signatures. The labels of this invention generally can include a number of conventional additional label components as well. They can include printing on their outer surface. They can include a substrate or backing on their inner surface. This is present to provide mechanical strength to the label. They can include a layer of adhesive, most commonly a pressure-sensitive adhesive on their inner surface or on the inner surface of the substrate or backing, if present to adhere the label to the object. They can also include a removable secondary backing sheet. Such sheets are common to virtually all pressure sensitive-adhesive labels which covers the adhesive layer before use to protect it and which is stripped away to expose the layer of adhesive just before the label is applied to the object. Additional features integrated into the label may include security features. Examples of optical security features are optically variable pigments, holograms and zero-order diffraction gratings that produce distinct color effects. Other features are invisible security features such as microtaggants, random microstructures or DNA. A specific embodiment may include flexible display elements. Examples of such elements are organic light emitting diodes (OLED), electrophoretic (e-paper), electrochromic, electroluminescent and electrowetting displays. Another specific embodiment may include a Radio-frequency identification (RFID) element.

In the disclosed systems, the processor can include signal comparators for detecting signal modifications, clocking and absolute time-keeping circuits. Further it can include a central processor that monitors the detector signaling circuits and stores detected dispensing events together with their time in appropriate memory cells. Still another component may be a wireless radio-frequency or optical communication interface for transmitting all this information to an outside system. Optional additional sensor modules are included in the system. Examples are temperature, touch sensing or other devices for patient input. Further optional components of the system are display or enunciator modules for providing visual or audible feedback to the patient. All mentioned components may be powered by a power-supply such as a battery or photovoltaic cell, together with the detector and processor.

This processor can also provide an information retrieval and retransmission system. This system can read the data provided by the detector and transmit it either to the medication-prescribing physician or to an organization that collects and compiles such data as indications of the times at which medication doses were taken in order to present the data to the medication-prescribing physician in appropriate form.

This detection can be specific for individual dosage forms or it can be based on the overall collection of dosage forms, depending upon whether or not information concerning specific individual doses is needed. The latter would likely be the case if the system were monitoring the dispensing of doses of more than one drug with a single device. The processor obtains this information, combines it with an absolute or relative time stamp that is received from a clock generator and timing circuit and the combined information can be stored in a digital memory.

The medication removal events together with their appropriate time stamps are most commonly stored by the central processor in the digital memory. This information can be read out and transmitted from time to time to an offsite information retrieval and retransmission system. Since the distance between this information retrieval and retransmission system and the medication event detection system of this invention is not known, there might be the need to provide the detection systems' wireless communication module with quite a high level of transmitted RF or optical power. An alternative is to store all information in the unitary system processor memory until all of the unit doses of medication have been dispensed or the medication regimen has come to a close. The patient can then place the used detector-processor unit together with its flexible substrate into a container or receptacle. This container or receptacle should be stored at a location conducive to effective transmission of data. Example is a location in the patient's home, which is combined with the information retrieval and retransmission system.

It will be appreciated by those of skill in the art that this label and label-detector combination has the potential to be quite universal in size and applicability. It will be further recognized that it can be used with a wide range of existing packages for objects and especially for the full range of existing medication dosage formats and dosage forms. The label does not involve complicated wire or printed traces but rather employs a robust stack of substantially uniform simple layered materials. It is simply added to (adhered to) existing drug packaging. There is no reason to believe that it will not serve well with additional packaging such as new drug dosage forms or new dosage form containers as they are developed hereafter.

BRIEF DESCRIPTION OF THE DRAWINGS

The subject matter of the invention will become more clearly understood in light of the ensuing description of embodiments herein, given by way of example and for purposes of illustrative discussion of the present invention only, with reference to the accompanying Figures, (or simply "FIGS."), wherein:

FIG. 14 shows an alternative implementation of an increased linear range of contact resistance versus applied force. It consists of highly conductive crosses that are located on the moderately conductive layer 1 and of concentric circles made of highly conductive material located on the moderately conductive layer 3. The crosses and the concentric rings are aligned with the voids of the insulator grid.

DETAILED DESCRIPTION AND EXAMPLES

To further illustrate the invention, the following examples are provided, with no intention to limit the scope of the invention.

The terms "right", "left", "bottom", "underneath", "below", "lowered", "low", "top", "above", "elevated" and "high" as well as grammatical variations thereof as optionally used herein do not necessarily indicate that, for example, a "bottom" component is below a "top" component, or that a component that is "below" is indeed "below" another component or that a component that is "above" is indeed "above" another component as such directions, components or both may be flipped, rotated, moved in space, placed in a diagonal orientation or position, placed horizontally or vertically, or be similarly modified. Accordingly, it will be appreciated that terms such as "bottom", "below", "underneath" "top" and "above" may be used herein for exemplary purposes only, to illustrate the relative positioning or placement of certain components, to indicate a first and a second component or to do both.

Figure 1:
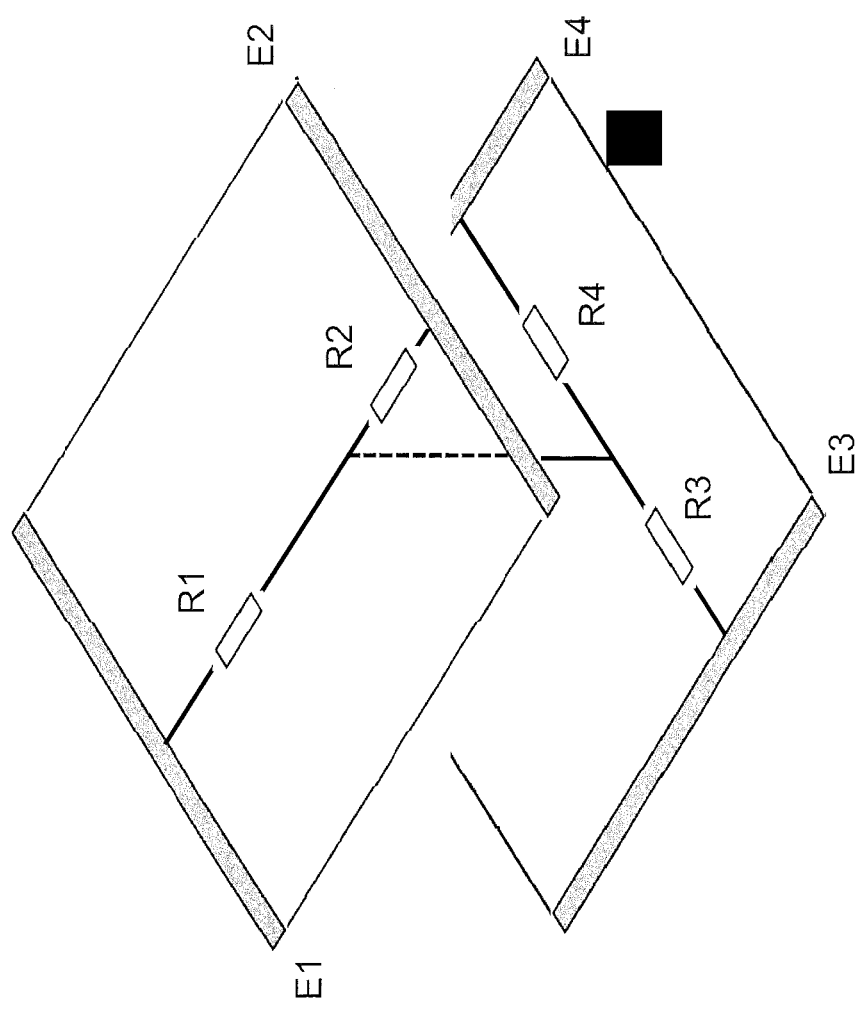
FIG. 1 is a schematic drawing of a typical touch screen geometry consisting of two conductive layers separated by a spacer layer and equipped with four electrodes.

Referring to FIG. 1 a generic touch-screen system is shown as known in the art. It consists of two conductive layers separated by a spacer layer that touches each other at the cursor focus. The conductive layers are electrically contacted by four crossed electrodes located at the edges of the panel. This configuration results in two voltage dividers in the upper as well as the lower layer as depicted in FIG. 1. The ratio between R1 and R2 yields the position of the pressure point in x-direction. In order to determine the ratio the electrodes E1 and E2 are set to a different, but know potential, so that a current flies over R1 and R2. At electrode E3 or E4 the resulting tension of the voltage divider is measured with a high-impedance. Based on the principle of time-multiplexing between x- and y-position determinations, a resistive touch-screen emits an electromagnetic interference signal. This kind of multiplexing can be avoided by schemes based on 5 electrodes. Resistive touch screen panels are not affected by outside elements such as dust or water and are the type most commonly used today. It will be apparent to those skilled in the art that based on this detection scheme it would be impossible have a touch screen foil that can be shaped by means of simple scissors to arbitrary size because of the positioning of the electrodes on opposite extremities. A generic touch screen foil that can be fabricated in a roll-to-roll process should have all electrodes positioned on the same side, namely on the long side of roll.

Figure 2:
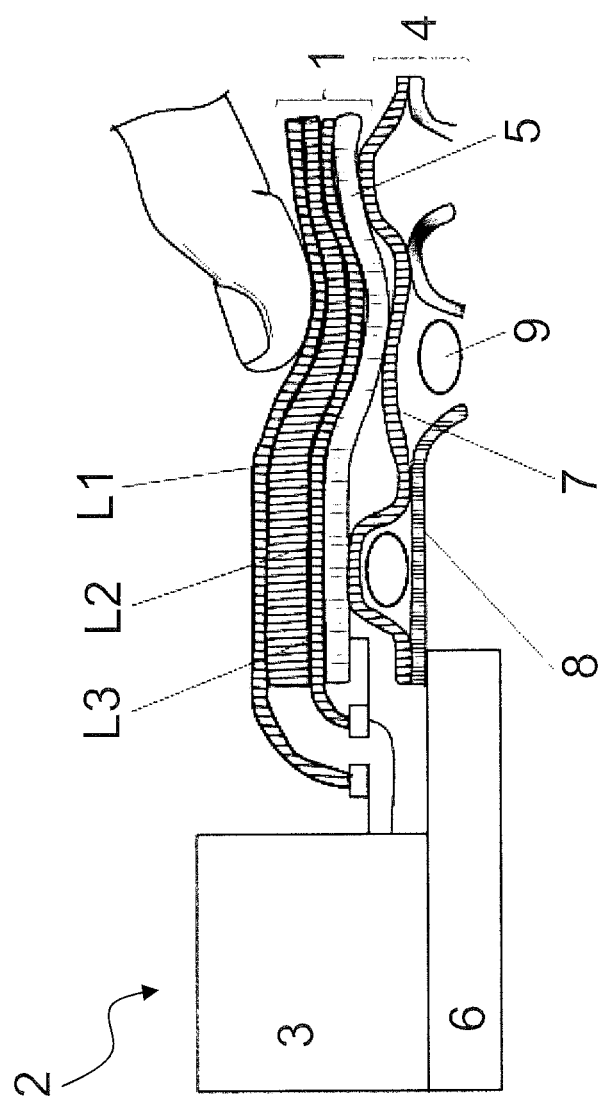
FIG. 2 is a cross-sectional view of an event-sensing label and its combination with a detector system according to the present invention used with a blister pack.

Referring to FIG. 2, a cross-sectional view of an event-sensing smart label with a detector system according to the present invention used with a blister pack is shown. The term "smart label" is used for a combination of a layer structure (1) with a detector system (2). The detector system (2) comprises at least a detecting electronics (3) and an electrical power supply (not shown). The layer structure (1) comprises a stack of a first layer (layer L1), a second layer (layer L2) and a third layer (layer L3). Layers L1 and L3 are each having at least two electrodes E for connecting the layers to the detector system (2), not all of them shown here. The layer structure (1) is affixed to the blister pack (4) via a self adhesive layer (5). In this embodiment the detector system (2) is attached to the blister pack by means of a mechanical clip (6). As the term "label" connotes, the device consisting of layers L1-L3 is substantially two-dimensional, having a thickness that is relatively small as compared to its length and width. As shown in FIG. 2, the smart label of this invention can be used in conjunction with a conventional blister package of the type used to dispense medication unit dosage forms (pills, capsules, etc). The blister pack (4) typically incorporates a flexible layer (7) and a frangible layer (8), the pills (9) arranged in between these two. The smart label according to the invention can also be used on blisters to dispense other small objects such as bolts, automotive parts, hardware and the like. Typically blister pack contains a plurality of objects individually packed between flexible layer and frangible flexible layer. As mentioned before, conductive layers L1 and L3 are electrically connected via suitable contacts to the detection electronics (3). The detection electronics (3) contains components such as timer, memory and communication devices. In embodiments of the invention, the layer structure (multi-layer stack) is at least one of the following: transparent, semi-transparent and at least translucide.

Thus, using the smart label it is possible to detect not only single events but also multiple events, whether simultaneous multiple events or sequential multiple events. It can be seen that the layer structure (1), the blister pack (4) and the detection electronics (3) can all be joined into a single unit. This enables a standard blister pack to be used. The smart label does not rely upon the breaking of breakable fine wires. Thus printed traces or the like other traces to provide the signal of object access, the alignment of the label and the blister are not critical. As a consequence the label can be quickly attached to the object (blister pack, container, etc) in the field by any person without the need of complicated assembly equipment.

The detecting electronic will typically continuously or periodically monitor the electrical signals from the layer structure. When a change in one or more of these signals is detected it is transmitted to a central processor. The central processor reads the appropriate time associated with the detected signal as obtained from a time keeping unit. This time information related to the accessing event is stored in memory. The time resolution of this event record is given by the accuracy of the time-keeping circuit and the frequency with which the central processor inspects the digital signals from the detector. The time resolution should be such as to lead to meaningful data concerning the accessing events. Example for time resolutions are every second, every 500 ms, every 200 ms or every 100 ms. For example to give information as to a patient's compliance with a drug dosing regimen or lack thereof.

In a specific embodiment, the multilayer label is compatible with the thermoforming process. Instead of laminating the label on an existing blister, it would directly be used as the actual blister package.

Figure 3:
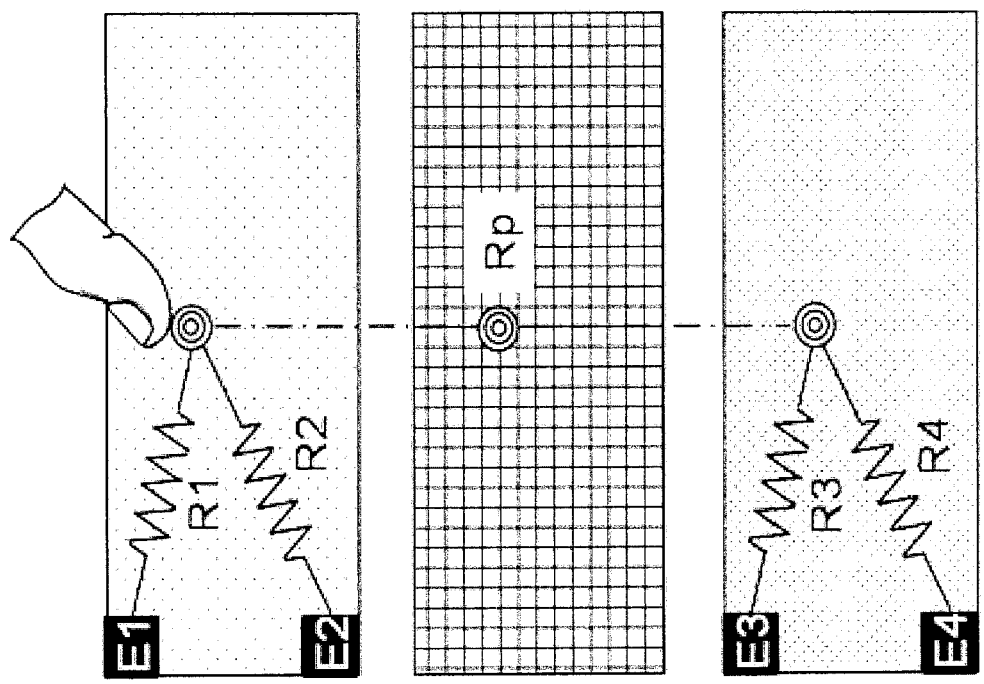
FIG. 3 is a schematic top view of the layer sequence of a smart label with force/pressure and positional discrimination. It consists of two homogeneous conductive layers with the same or with a different sheet resistance separated by a highly resistive spacer layer.

Referring to FIG. 3 a schematic top view of the different layers of the layer structure (1) is shown. The three functional layers L1, L2, L3 are drawn apart for clarity, but have to be thought as being on top of each other. Layers L1 and L3 are identical conductive or semiconductive layers. According to embodiments of the invention, each layer L1, L3 has a moderate conductivity in the range of for example $10^{-3}$ to $10^{2}$ S/m. Materials having a conductivity of from for example about 1 to about $10^{2}$ S/m may be preferred. As this range of conductivities reflects, these layers 1 and 3 can be layers of conductive or semiconductive polymers. They can also be conductive and semiconductive inorganic compounds such as conductive or semiconductive metal oxides and sulfides. The first and third layers 1 and 3 can be composed entirely or substantially of such conductive materials and may be applied directly onto opposing sides of the intermediate layer L2 such as by printing, by coating with a solution of the material, by chemical deposition such as by vapor depositing or physical vapor deposition such as evaporation or sputtering.

Each of the layers L1 and L3 has two electrodes (E1, E2 and E3, E4) in the form of electrode pads located on the same side of the layer structure, i.e. altogether there are four electrodes connected to the detection electronics (3). The electrodes have good electrical contact with the conductive layers. In first order approximation for each cursor pressure point (point where layers L1 and L3 are brought in electrical contact by finger pressure) one can indicate two distinct film resistances R1 and R2. They are given in the first order by the sheet resistance of the conductive film and the distance between cursor point and electrode. The pressure dependent resistance between the upper and lower layer is depicted with the symbol Rp. The first and the third layer (L1 and L3) may have different conductivity, but for simplicity only the special case with R1 equals R3 and R2 equals R4 is presented here.

By measuring the resistance between one of the upper electrodes and one of the lower electrodes and in addition the resistance of a parallel connection of the upper two electrodes and the lower two electrodes, it is possible to deduce R1, R2 and Rp:

$$R_{1,3} = 2R_1 + R_p \quad \text{(Eq. 1)}$$

$$R_{1,4} = R_1 + R_2 + R_p \quad \text{(Eq. 2)}$$

$$R_{1\|2,3\|4} = 2\frac{R_1 R_2}{R_1 + R_2} + R_p \quad \text{(Eq. 3)}$$

There are three equations for 3 unknowns (R1, R2, Rp). If the equations 1-3 are linearly independent there should be a well defined solution:

$$R_p = R_{1\|2,3\|4} - \sqrt{R_{1\|2,3\|4}^2 - R_{13}^2 - 2R_{1\|2,3\|4}R_{14} + 2R_{13}R_{14}} \quad \text{(Eq. 4)}$$

$$R_1 = -\frac{1}{2}R_{1\|2,3\|4} + \frac{1}{2}R_{13} + \frac{1}{2}\sqrt{R_{1\|2,3\|4}^2 - R_{13}^2 - 2R_{1\|2,3\|4}R_{14} + 2R_{13}R_{14}} \quad \text{(Eq. 5)}$$

$$R_2 = R_{14} - \frac{1}{2}R_{1\|2,3\|4} - \frac{1}{2}R_{13} + \frac{1}{2}\sqrt{R_{1\|2,3\|4}^2 - R_{13}^2 - 2R_{1\|2,3\|4}R_{14} + 2R_{13}R_{14}} \quad \text{(Eq. 6)}$$

The goal of determining Rp is fulfilled already at this stage. From R1 and R2, with the knowledge of the linear resistance per unit length α, the separation distance d between electrodes 'E1' and 'E2' and neglecting border effects, it is then also possible to determine the cursor position:

$$x = \frac{1}{2}\frac{d^2 a^2 + R_1^2 - R_2^2}{a^2 d} \quad \text{(Eq. 7)}$$

$$y = \frac{1}{2}\frac{\sqrt{-d^4 a^2 + 2R_1^2 d^2 a^2 + 2d^2 a^2 R_2^2 - R_1^4 + 2R_1^2 R_2^2 - R_2^4}}{a^2 d} \quad \text{(Eq. 8)}$$

Figure 4A:
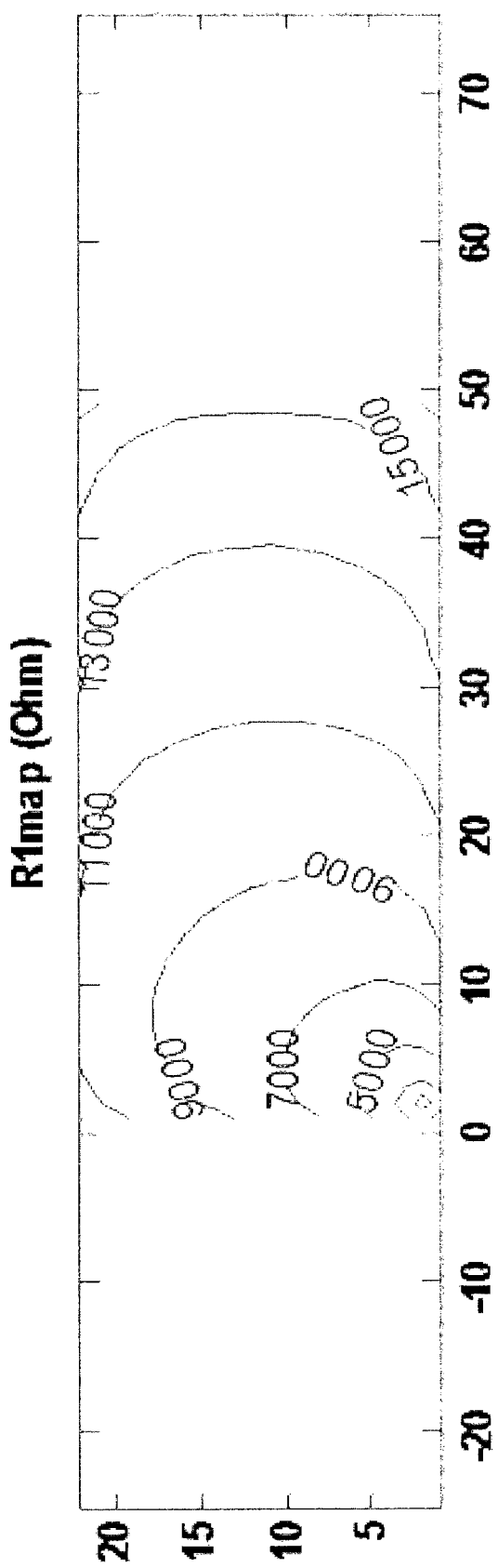
FIGS. 4A 4B and 4C shows three different contour plots of the resistance distribution on a rectangular sheet in 'layer 1' as depicted in FIG. 3. 'R1map' depicts the resistance between electrode 'E1' and an arbitrary point on the conductive layer including border effects. 'R2map' depicts the resistance between electrode 'E2' and an arbitrary point on the conductive layer. 'R12map' depicts the resistance between electrode 'E1' and 'E2' connected in parallel and an arbitrary point on the conductive sheet.
Figure 4B:
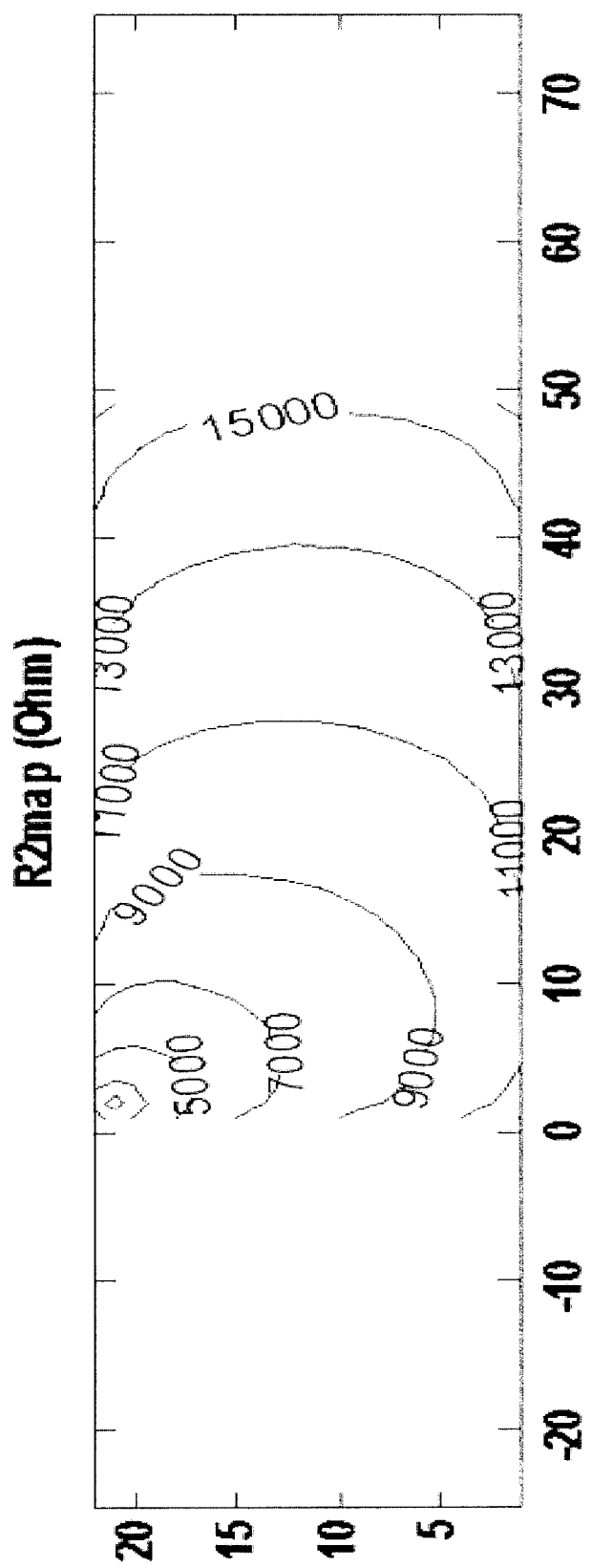
Figure 4C:
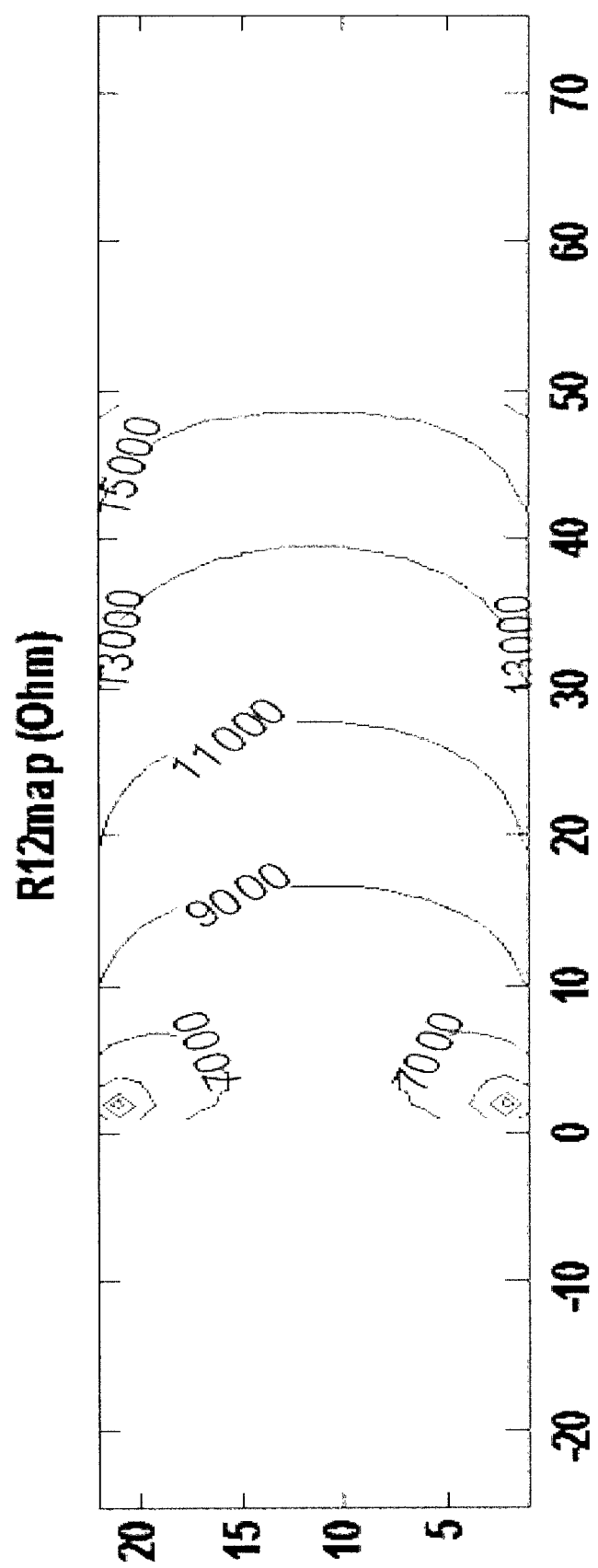

In practice to determine the position it is, however, simpler to work with look-up tables and to calculate the different resistance maps a-priori, as depicted in FIG. 4.

A person skilled in the art will agree that it is possible to extract location and pressure independently from each other with a multiplexed resistance read-out system that could be fully automated with a high sampling rate.

The layers L1 and L3 themselves can be made of a moderately conductive layer and a substrate, most commonly a plastic substrate. Polyesters such as poly(ethylene terephthalate) (Mylar) or Polyethylene Naphthalate (PEN) coated by conductive polymers such as PEDOT:PSS are commercially available and can be used. If a substrate material is used, it may generally be preferred in the respective embodiment to arrange the layers such that the substrate is placed away from the middle ("second") layer L2 and not between the middle layer L2 and the conductive coating of either of the conductive first and third layers (L1 and L3). The thickness of these conductive layers is not critical and can for example range from a few nanometers in the case of directly-deposited layers without a substrate to up to 50 microns when including a plastic substrate. Thickness of conductive layers is in the range of for example, 20 nm to 20 microns. In an embodiment of the invention, the substrate thickness is, for example, in the 5-250 micron range. In some embodiments, the substrate thickness ranges from 5 to 50 microns.

If substrate based layers L1 and L3 are used, they need to be fastened to the intermediate layer L2. This can be carried out using adhesives or thermal lamination methods. What is important is that the layers L1, L2 and L3 are robust, flexible and conformable to the object to which the label is attached. The second layer L2 in FIG. 3 is formed from a material which may be an insulator or a semiconductor or conductor of lower conductivity than the first and third layers. For example it can have a conductivity that is from for example about $1\times10^{-2}$ to about $1\times10^{-6}$ times the conductivity of the first and third layers L1 and L3. This 'layer L2' should have a substantial thickness. According to an embodiment of the invention, the thickness is for example from about a few microns to about 1 or 2 millimeters or from about 10 microns to about 1 millimeter. This 'layer L2' separates the first and third layers L1 and L3. The material of 'layer L2' should be deformable and compressible, such as resilient foam or plasticized polymer. It can be organic polymer foam or a plasticized organic polymer sheet. In respective embodiments of the invention, it is made for example of one of the following: transfer glue with patterned air voids, 'foam-tape', high-density foam, coated with transfer glue on both sides and air voids patterned. Such patterning can be easily be done by rotary knife cutting as it is commonly used in the fabrication of labels. In an alternative embodiment the glue grid is deposited by printing technology (screen printing, gravure, flexo, inkjet). Instead of a grid made out of transfer glue, one could use a spacer layer consisting of a regular array of printed glue dots.

Sometimes it is desired to have a degree of electrical conductivity in layer L2. This conductivity can be introduced to the material by incorporating conductive or semiconductive organic polymers or liquids into the material of layer L2 or by incorporating conductive or semiconductive particles such as carbon black, graphite, metal particles or single- or multi-walled carbon nanotubes into the material of layer L2. By adjusting the concentration of conductive material a piezoresistive material can be generated with well defined percolation threshold.

The relationship among these three layers, with a pair of conductive layers L1 and L3 separated by a deformable compressible middle layer L2 creates a characteristic electrical signature for the label. That is, there is a characteristic resistance when it is applied to the object being monitored which can be measured across layers L1 and L3. When a force or pressure is applied to the layer structure, this force can deform and compress at least in part the middle layer L2. This compression or deformation will have the effect of altering the electrical characteristics or signature of the smart label. This altering will be observed most commonly as a decrease in resistance either temporarily during applied pressure or continuously.

Referring to FIG. 4 an electrical simulation is carried out to determine the electrical resistance distribution on a conductive sheet of a given width and height. 'R1map' depicts the resistance between electrode 'E1' and an arbitrary point on the conductive layer including border effects. 'R2map' depicts the resistance between electrode 'E2' and an arbitrary point on the conductive layer. 'R12map' depicts the resistance between electrode 'E1' and 'E2' connected in parallel and an arbitrary point on the conductive sheet. These maps can be used by a person skilled in the art as look-up tables to determine the 3 parameters x-position, y-position and pressure dependent contact resistance.

The first and the third layer (L1 and L3) may for example consist of a Carbon-black loaded PET foil as it is used in protection pouches for electronic devices that are sensitive to electrostatic discharge. The thickness is for example 80 micron and the sheet resistance ranges for example from 10 kOhm to 100 kOhm. The second layer (L2) is a spacer layer that consists of a glue-grid, prepared by rotary-cutting The four electrodes are connected to a read-out system with A/D converter USB converter and a Labview interface (not shown). The electrical resistance of the layer structure can be measured by adding a shunt resistance in series to the layer structure, applying a known voltage $U_o$ and measuring the voltage $U_s$ over the shunt resistance. The resistance of the layer structure $R_L$ follows then from the well-known voltage-divider formula:

$$R_L = R_S \frac{(U_0 - U_s)}{U_s}$$

Four photo relays were used to quickly switch the connections between the different electrodes in order to measure in repetition the resistance between electrodes 'E1' and 'E3' as well as between 'E1' and 'E4' and finally between 'E1' and 'E2' connected in parallel and 'E3' and 'E4' connected in parallel. The supply of the switching voltages and the applied voltage '$U_0$' as well as the measurement of the shunt voltage $U_s$ was all done with a low-cost, bus-powered DAQ for USB from National Instruments.

Figure 5:
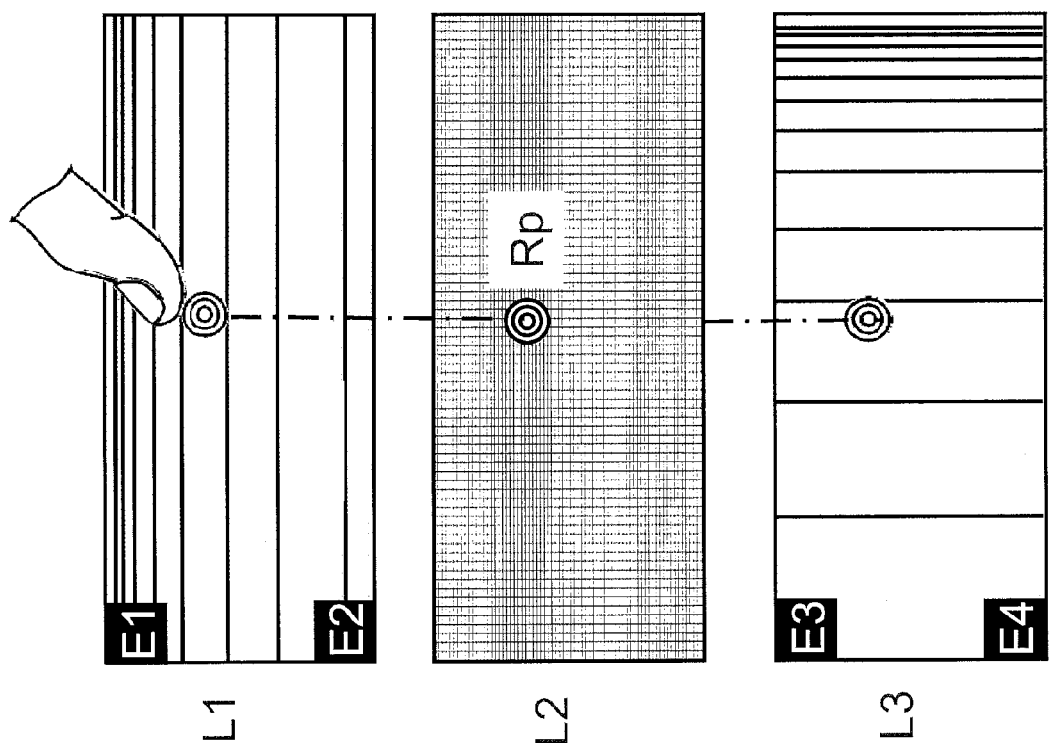
FIG. 5 is a schematic top view of the layer sequence of a smart label. It consists of two conductive layers with anisotropic conductivity, separated by a non-conductive spacer layer, such as a grid. The first and the third layer have a gradient of conductivity in at least one of a vertical and horizontal direction, respectively. The lines could represent highly conductive lines which are then covered by a semi-transparent layer with medium conductivity.

Referring to FIG. 5 a schematic top view of the layer sequence of one embodiment of a smart label according to this invention is shown. It consists of two conductive layers (L1 and L3) with anisotropic conductivity. These layers are separated by a non-conductive spacer layer (L2), such as a grid. The first and the third layer (L1 and L3) have a gradient of conductivity in vertical and horizontal direction, respectively. The lines represent highly conductive stripes which are covered by a semi-transparent layer with medium conductivity.

This embodiment improves the position detection precision for positions located far away from the four electrodes by adding an asymmetry in conductivity to the system. Referring back to FIG. 4 it can be seen that the differences between the three different resistance maps decrease with increasing distance from the electrodes. As such, the position accuracy is increasingly influenced by inhomogeneities in layer conductivity and border effects the further the position is located from the electrodes. This particular solution mitigates the short comings related to the use of homogeneous conductive layers by creating larger differences in between the different electrode configurations.

In an embodiment of the invention the highly conductive lines are patterned by inkjet printing or gravure printing of highly conductive inks such as silver or copper inks. The lines are then covered by a moderately conductive layer made of transparent or semi-transparent conductive polymers such as PEDOT:PSS.

Figure 6:
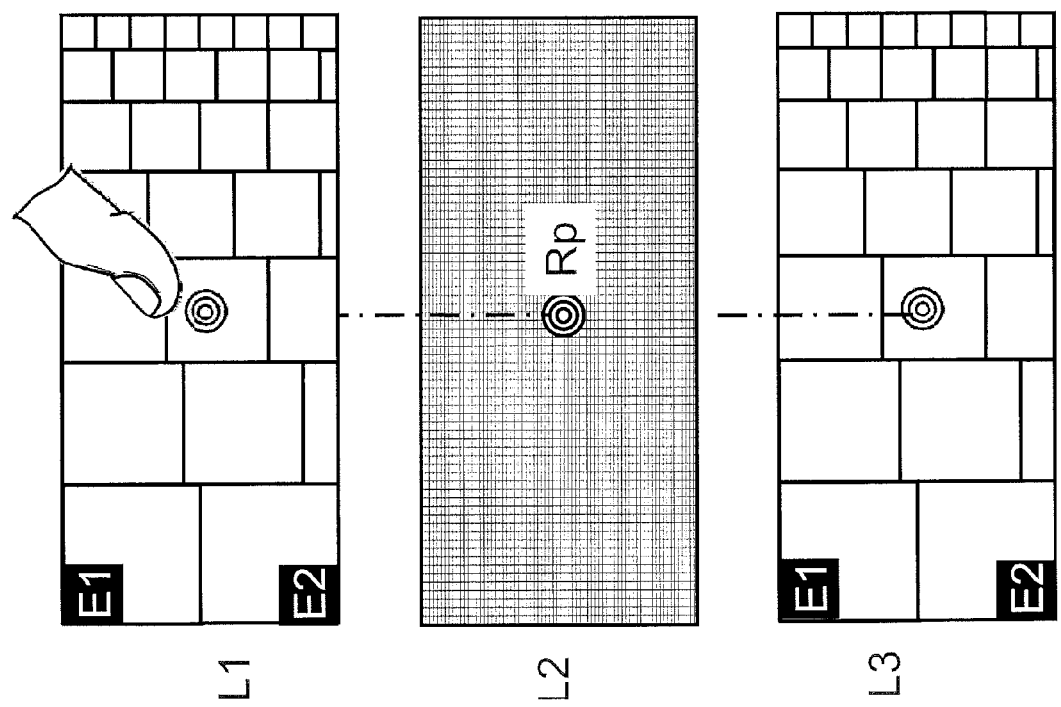
FIG. 6 is a schematic top view of the layer sequence of a smart label. It consists of two conductive layers, separated by a non-conductive spacer layer, such as a grid. The first and the third layer have conductive lines patterned in a way that results in a gradient of conductivity along the horizontal direction. The conductive lines are then covered by a semi-transparent layer with medium conductivity.

Referring to FIG. 6 a schematic top view of the layer sequence of still another embodiment of a smart label according to this invention is shown. It consists of two conductive layers (L1 and L3), separated by a non-conductive spacer layer (L2), such as a grid. The first and the third layer (L1 and L3) have conductive lines patterned in a way that results in a gradient of conductivity along the horizontal direction. The conductive lines are then covered by a semi-transparent layer with moderate conductivity. The idea behind is similar to the solution presented in FIG. 5. By adding a gradient of increased conductivity towards the back, the zone for which the position can be determined accurately is shifted further away from the electrodes. The gradient in sheet resistance is established by applying a highly conductive grid with a changing periodicity.

In an embodiment of the invention the highly conductive lines are patterned by inkjet printing or gravure printing of highly conductive inks such as silver or copper inks. The lines are then covered by a moderately conductive layer made of transparent or semi-transparent conductive polymers such as PEDOT:PSS.

Figure 7:
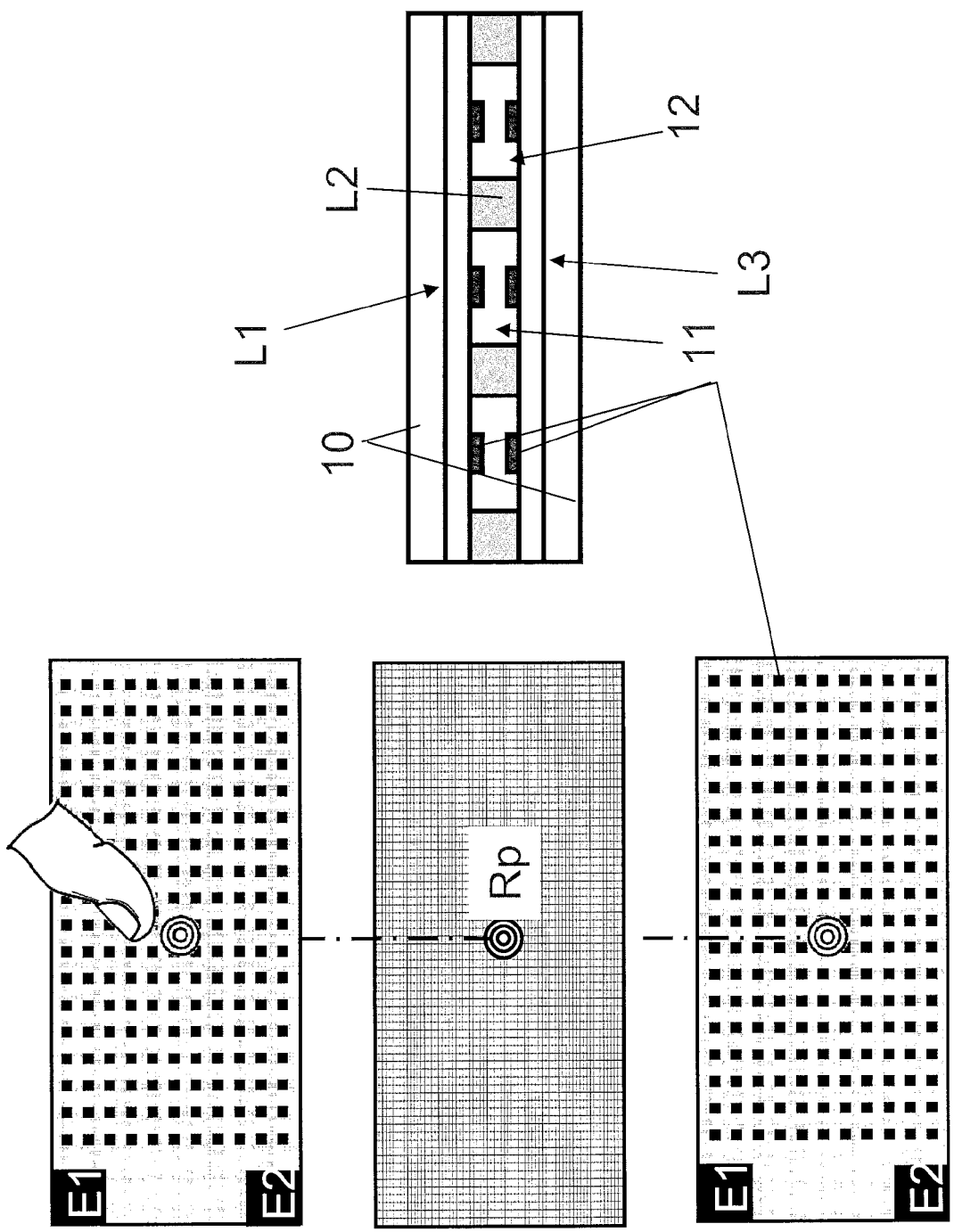
FIG. 7 is a schematic top view of the layer sequence of a smart label. It consists of two moderately conductive layers, separated by a non-conductive spacer layer, such as a grid. The first and the third layer have patterned contact pads made out of a highly conductive material and which are aligned with the holes of the spacer grid. On the right-hand side a cross-section of the device is given.

Referring to FIG. 7 a schematic top view of the layer sequence of still another embodiment of a smart label according to this invention is shown. It consists of two moderately conductive layers (L1 and L3), separated by a non-conductive spacer layer (L2) with holes, such as a grid. L1 and L3 may each be arranged on a substrate (10). The first and the third layer (L1 and L3) have patterned contact pads (11) made out of a highly conductive material. These patterned contact pads are aligned with the holes (12) of the spacer layer (L2). On the right-hand side a cross-section of the device is given. In the simplest scheme depicted in FIG. 3 the resistance in the sheet and the contact resistance are somehow linked with each other. For example, if conductive layers with a relatively high sheet resistance are chosen, then the contact resistance $R_p$ will also be relatively high or wise versa. The proposed solution allows decoupling the contact resistance from the serial resistance used for the position detection. This allows to increase the accuracy of position detection with a higher resistive film while keeping the contact resistance low.

Figure 8:
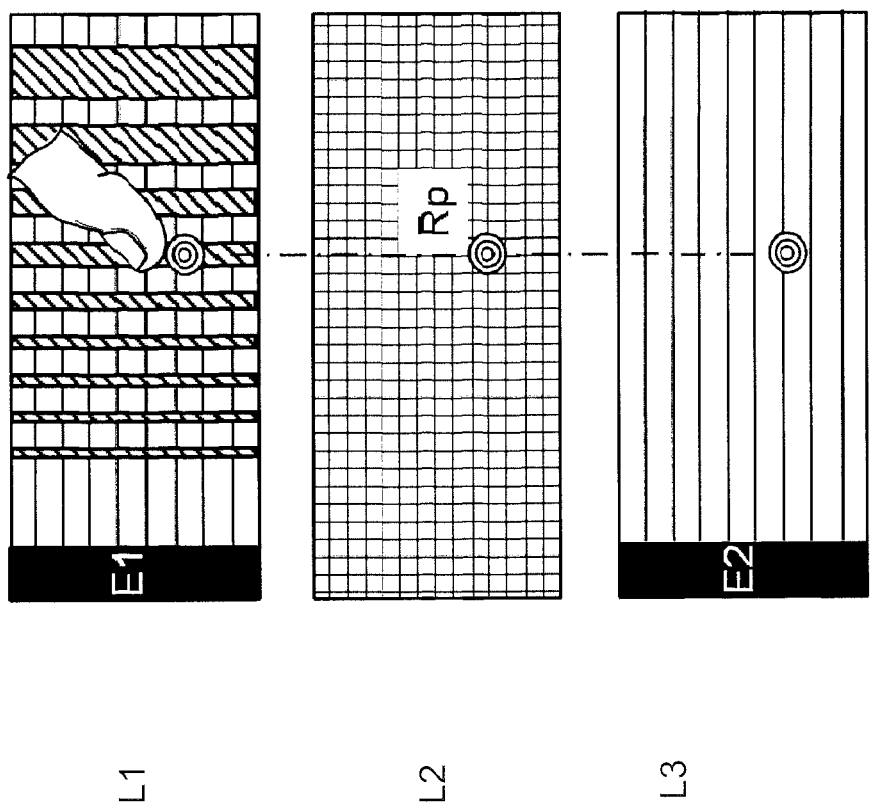
FIG. 8 is a schematic top view of the layer sequence of a smart label with position independent force/pressure discrimination. It consists of a lower electrode with highly conductive parallel lines and an upper electrode with highly conductive parallel lines of increasing width the further they are away from the contact electrodes. The goal is to have the same resistance change for the same pressure/force independent of position.

Referring to FIG. 8 a schematic top view of a further embodiment of the layer sequence of a smart label according to this invention is shown. This embodiment offers position-independent force/pressure discrimination. It consists of lower electrode E2 with highly conductive parallel lines on top of conductive, semi-conductive or isolating layer and an upper electrode E1 with highly conductive parallel lines of increasing width with increasing distance from the contact electrodes. The top and the bottom layer are usually separated by an isolating layer with air voids, as previously mentioned in the description of FIG. 3. The total resistance measured between the upper and the lower electrode is basically the sum of twice the linear resistance per unit length multiplied by the distance and the pressure dependent contact resistance. By applying a pressure, the upper layer is bent like a membrane and establishes a physical contact. The contact resistance is proportional to the contact area. The idea is to pattern the top layer in such a way that the increased resistance due to a long propagation distance is compensated by an increased surface in such a way that the same applied pressure yields the same resistance change independent of position.

In a particular embodiment the highly conductive lines are patterned by inkjet printing or gravure printing of highly conductive inks such as silver or copper inks. The lines are then covered by a moderately conductive layer made of transparent or semi-transparent conductive polymers such as for example PEDOT:PSS.

Figure 9:
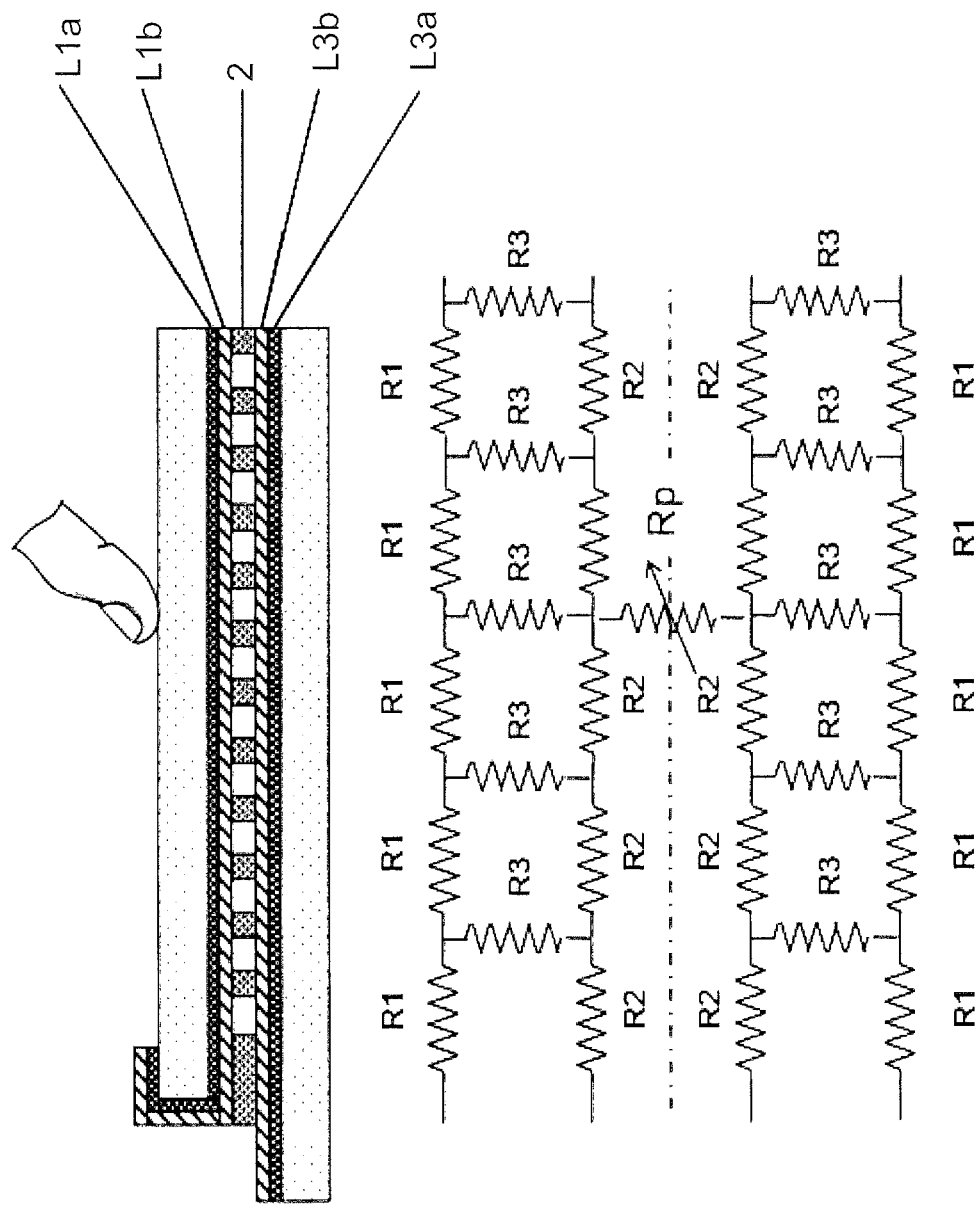
FIG. 9 is a schematic top view of the layer sequence of a smart label with position independent force/pressure discrimination. It consists of two highly conductive layers (layer 1 and 5), two moderately conductive layers (layer 2 and 4) and a spacer layer with air voids that allows for physical contact between the upper and lower electrode. The goal is to have the same resistance change for the same pressure/force independent of position. The lower part of this figure shows the equivalent circuit where Rp is marked as a variable resistor depending on the applied pressure.

Referring to FIG. 9 a schematic top view of the layer sequence of a smart label with position independent force/pressure discrimination is shown. It consists of two highly conductive layers (layer L1a and L3a), two moderately conductive layers (layer L1b and L3b) and a spacer layer L2 with air voids, as described in FIG. 3, that allows for physical contact between the upper and lower electrode. The idea is that both the top and the bottom electrode consist of two conductive layers on top of each other with very different conductivity. The highly conductive layers L1a and L3a make sure that the resistance between the contact pads and the cursor point is negligible in comparison to the pressure dependent contact resistance. The lateral conductivity is basically given by two parallel resistances corresponding to the two layers with different conductivity, whereas the layer resistance is then dominated by the low resistance layer (resistances R1). The contact resistance is on purpose increased by the fact that the electrical contact occurs between the two moderately conductive layers. The equivalent electrical circuit is displayed in FIG. 9, whereas R1<<R2, R3<<R2 and R1<<Rp. In conclusion the proposed scheme offers the possibility of having the same resistance change for the same pressure/force independent of position.

In an embodiment of the invention the highly conductive lines are patterned by inkjet printing or gravure printing of highly conductive inks such as silver or copper inks. The lines are then covered by a moderately conductive layer made of transparent or semi-transparent conductive polymers such as PEDOT:PSS.

Figure 10:
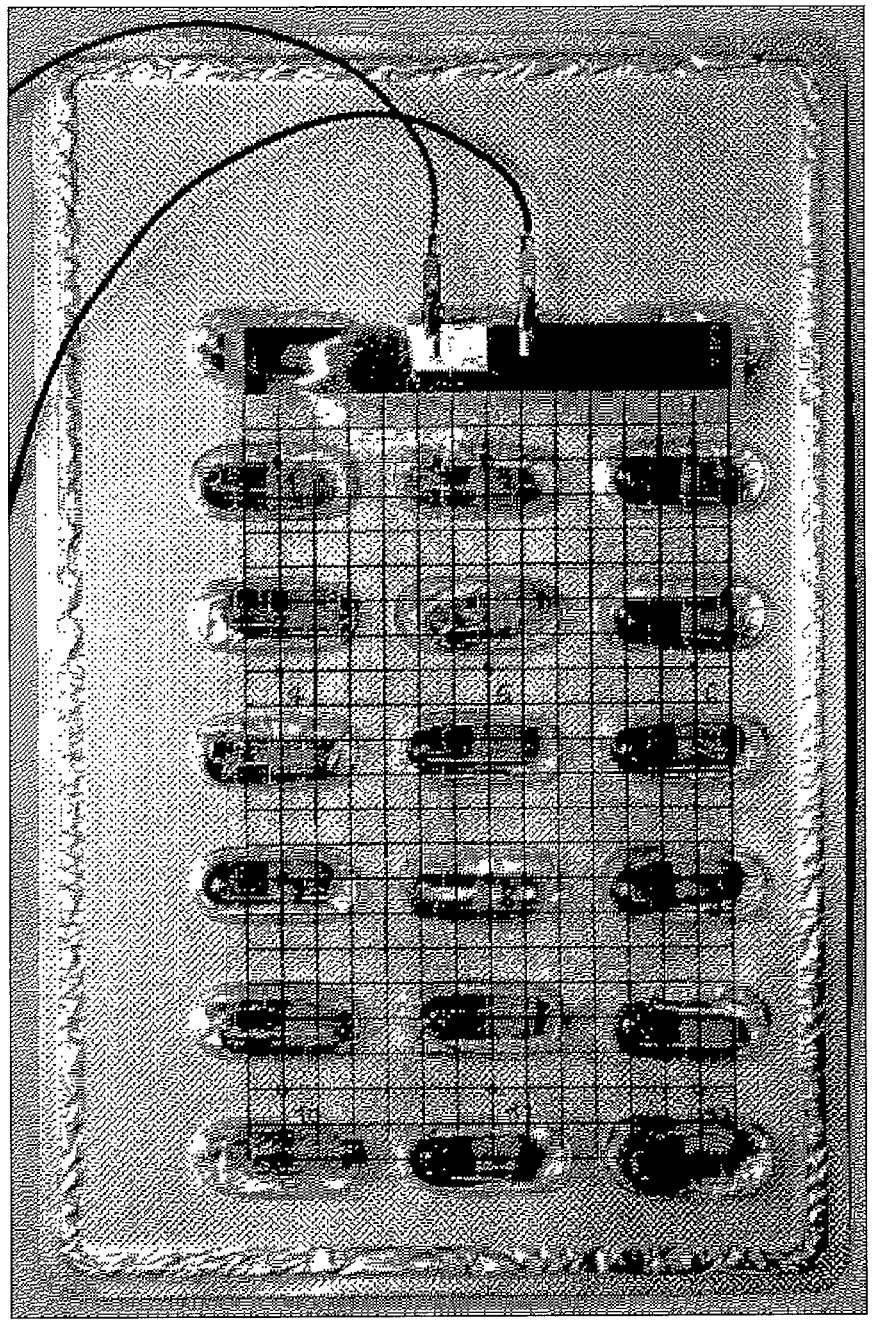
FIG. 10 shows the photograph of a demonstrator based on the embodiment depicted in FIG. 9. The demonstrator shows good transparency.

FIG. 10 is based on a photograph of a demonstrator based on the smart label depicted in FIG. 9, the smart label being a multilayer structure consisting of two coated PET substrates glued together by a glue grid that was fabricated by rotary-cutting. The glue grid was made of 9469 adhesive transfer tape from 3M with square holes measuring 3 by 3 mm arranged in a rectangular pattern separated by 2 mm wide glue lines. On each of the two flexible substrates a high-conductivity layer consisting of an inkjet-printed grid of nano-silver ink (CCI-300 from Cabot Corporation) is deposited. The distance of the lines of silver ink was 5 mm. On top of this layer a homogeneous and transparent and approximately 140 nm thick film of PEDOT:PSS is deposited as low-conductivity layer. The demonstrator shows good transparency (better than 90% transmission).

Figure 11:
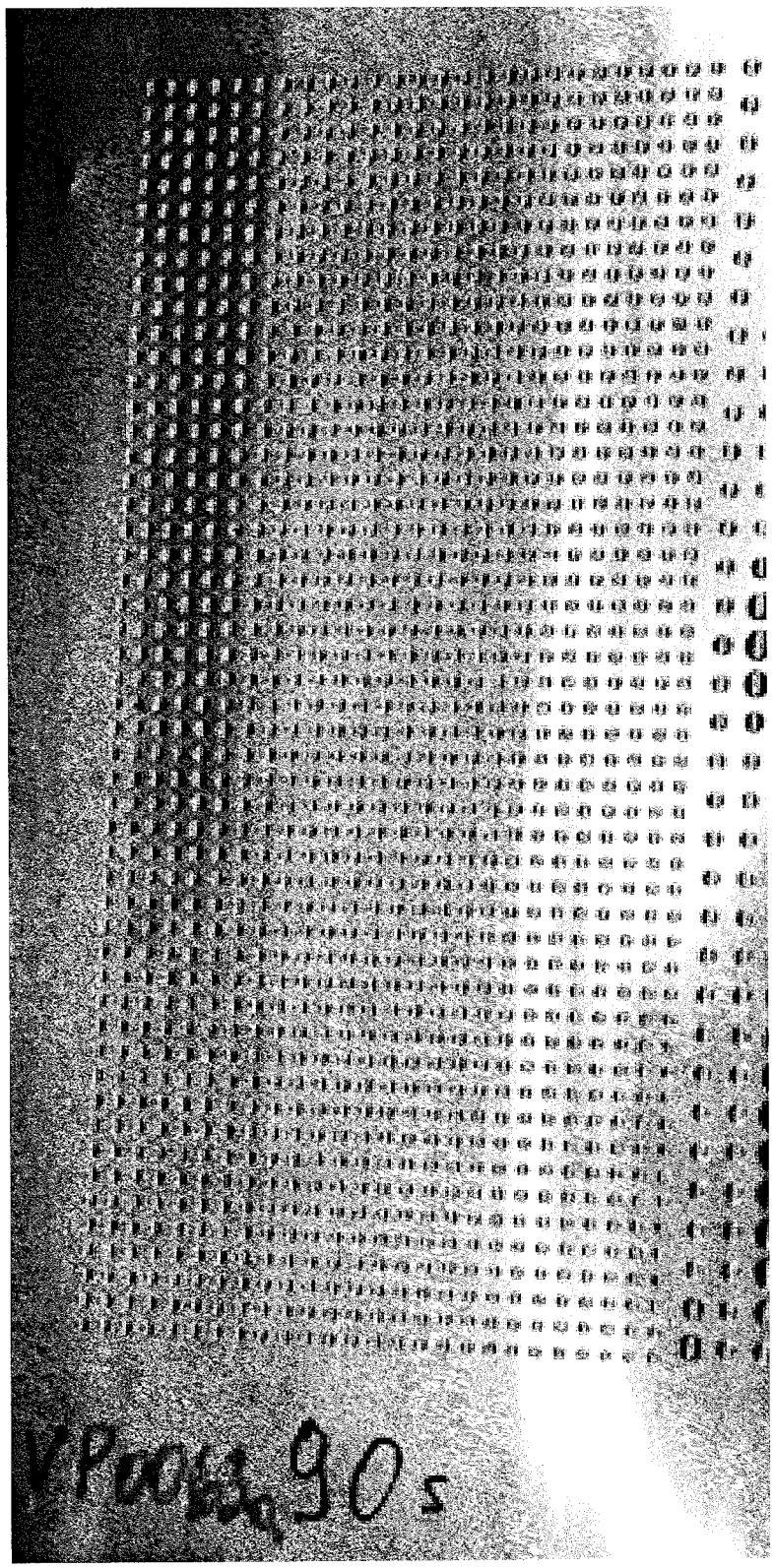
FIG. 11 shows the photograph of a screen-printed array of glue bumps used as a spacer layer and to mechanically combine the two conductive layers.

Referring to FIG. 11 is based on a photograph showing a screen-printed array of glue bumps (13) which is used as a spacer layer. A second function of it is to mechanically combine the two conductive layers. By changing the separation distance and the height of the bumps, the force response of the sensor can be adjusted. The separation distance is for example in at least one of the following ranges: 0.1-5 mm, 0.1-2 mm and 0.5-1.5 mm. Another parameter is the diameter of the thread of the screen-printing mesh, which allows to adjust the height of the bumps and thus the force response. In an embodiment, the height of the bumps is for example in one of the following ranges: 10-1000 micron, 50-500 micron and 100-200 micron. In case of rotary-screen-printing this method would be compatible with roll-to-roll manufacturing. The screen-printed spacer layer is compatible with all different embodiments described in this patent application.

Figure 12:
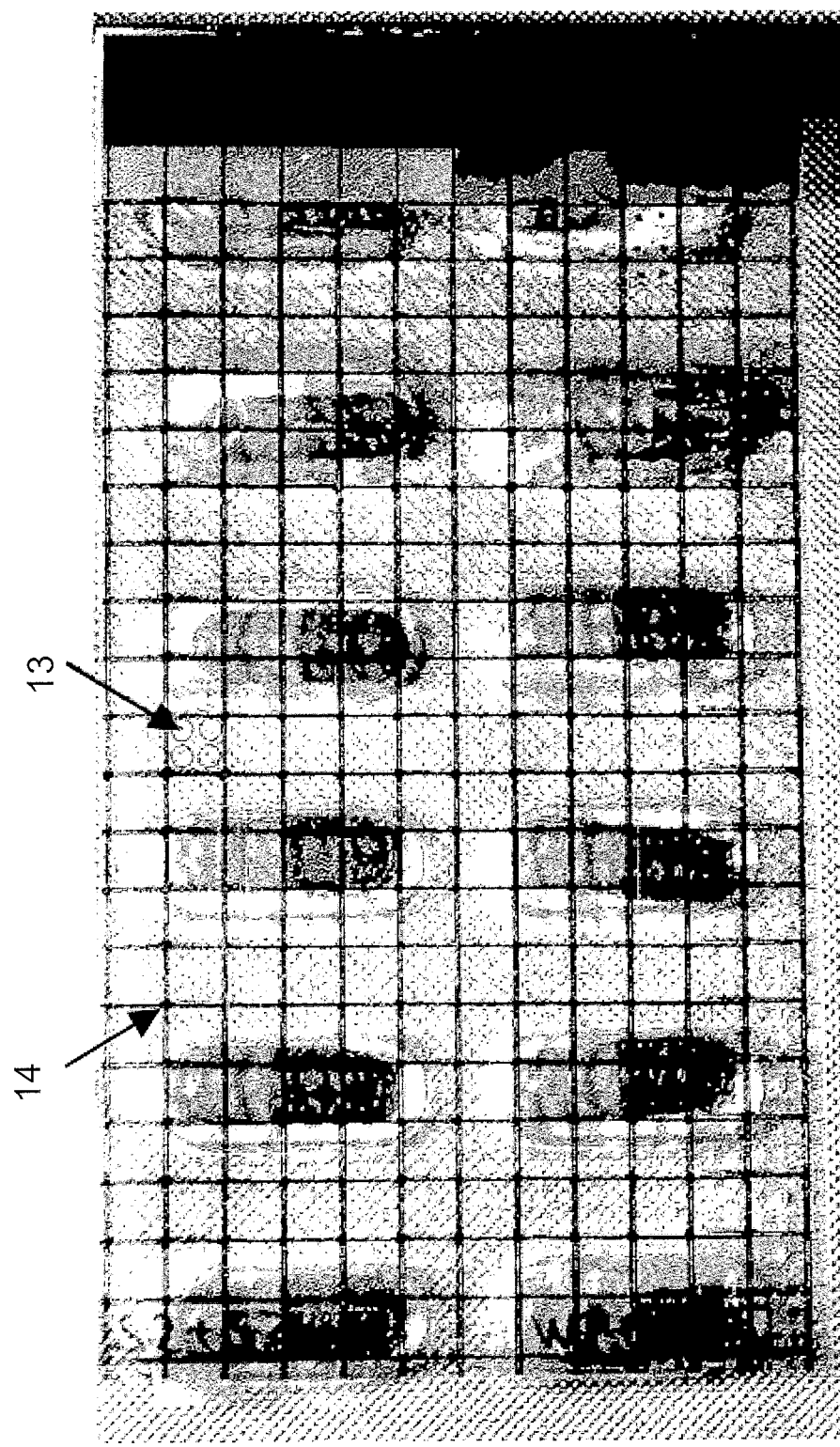
FIG. 12 shows the photograph of a demonstrator based on the embodiment depicted in FIG. 9 and in addition using an array of screen-printed glue bumps. The demonstrator shows good transparency.

Fig. 12 is based on a photograph of a demonstrator based on the idea depicted in FIG. 9 is shown. It is identical to the demonstrator shown in FIG. 10 with the difference that the glue grid produced by rotary knife cutting is replaced by an array of screen-printed spacer dots. The distance and height of the glue bumps is 120 µm. The glue bumps (13) are arranged between the grid lines of a silver grid (14).

Figure 13:
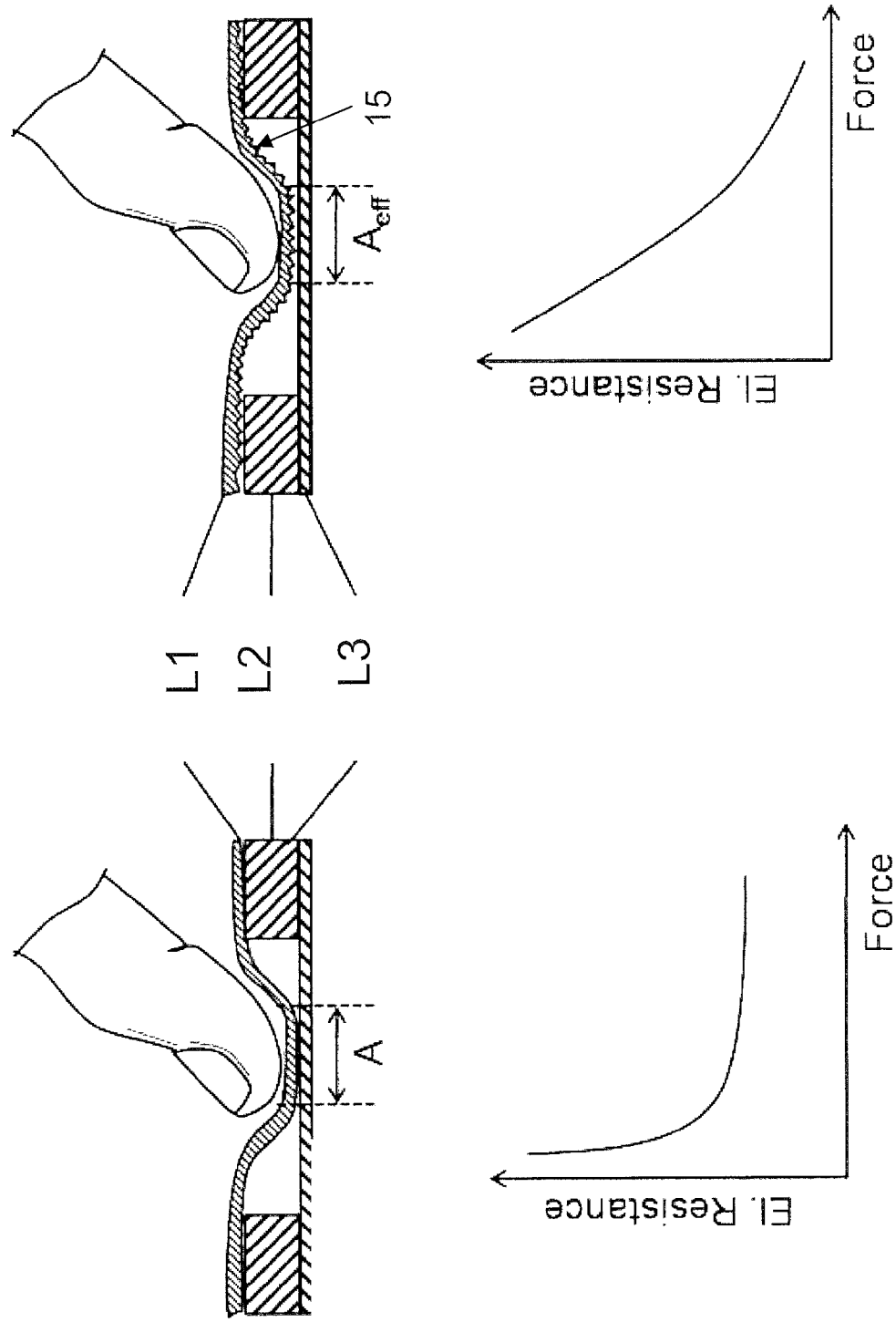
FIG. 13 is a cross-sectional view showing the typical configuration of two conductive layers separated by an isolating spacer grid with air voids. The contact resistance is basically proportional the surface over which the two conductive layers make physical contact. This result in a highly unlinear resistance vs force relationship (see left side). By microstructuring one or both conductive layers the contact resistance after touching can be further decreased by indenting the one or two microstructures and thus further decreasing resistance.

Referring to FIG. 13 a cross-sectional view showing the typical configuration of two conductive layers separated by an isolating spacer grid with air voids is shown. The contact resistance is basically proportional the surface over which the two conductive layers make physical contact, which results in a highly unlinear resistance vs force relationship (see left side). By microstructuring one or both conductive layers the contact resistance after touching can be further decreased. If just one layer is microstructured this microstructures need to deform to fully touch the other surface. In the case of two microstructured layers the two microstructures need to indent and therefore further decreasing resistance. This leads to a more linear resistance-force or pressure relationship as schematically shown. In an embodiment, the microstructures are fractal shaped or micropyramides (15). The lateral and vertical size of the microstructures is in the range of 100 nm-1 mm. In respective embodiments, the range is for example at least one of the following: 1-100 micron, 1-50 micron and 1-10 micron. Such microstructures could be fabricated in a roll-to-roll process by roll embossing, laser ablation, chemical wet processing. The described approach is compatible with the approaches described in FIGS. 2, 3, 5, 6, 9.

Referring to FIG. 14 an alternative implementation of the smart label according to this invention is shown which provides increased linear range of contact resistance versus applied force. It consists of highly conductive crosses (16) or similar patterns that are located on the moderately conductive layer L1 and of concentric circles (17) or similar patterns made of highly conductive material located on the moderately conductive layer L3. The crosses and the concentric rings are aligned with the voids of the insulator grid. As shown on the right-hand side of the figure the contact resistance decreases with increasing force. Depending on the applied force, the layer L1 is more or less bent down and the cross (16) from the upper layer L1 contacts a smaller or larger number of the concentric rings (17) of the lower layer L3. Thus stepwise the contact resistance decreases. The described approach is compatible with the approaches described in FIGS. 2, 3, 5, 6, 9.

Manufacturing:

Most embodiments can be fabricated in a roll-to-roll compatible process. In the following one example of a possible manufacturing route is disclosed. A photograph of a label manufactured according to this route is shown in FIG. 10. Layer 1 and Layer 2 are 100 micron thick PET foils on which a conductive grid is printed on the inward looking face by ink jet printing of CI-300 Cabot silver ink. The line spacing of the grid is 5 mm and the line width is approximately 0.1-0.2 mm. Alternative fabrication methods include gravure printing, rotary screen-printing and roll-to-roll inkjet printing. Instead of roll-to-roll processes, reel-to-reel or sheet-to-sheet processes are also possible for most embodiments. Alternative inks include aluminum inks, copper inks or very high conductivity polymer inks such as PEDOT:PSS under the brand name of Clevios PH1000 with addition of 5% DMSO. The conductive grids are then coated with slot-casted or spray-coated moderately conductive polymer such as AGFA Orgacon HBS or various kinds of PEDOT:PSS available under the brand name of Clevios. Typical layer thickness of the conductive polymer layer is 100-200 nm, depending on the specific resistivity of the material. The spacer layer consists of a grid made of transfer glue. The grid consists for example of squared holes measuring three by three millimeters separated by a band of two millimeters. The transfer glue can be patterned with a rotary knife patterning of transfer glue deposited on a silanized paper, which is commercially available under the brandname VHB from 3M. The pattern consists of a regular square array of square air voids. Other geometries such as non-squared arrangement of non-squared holes shall be included here as well. The patterned transfer glue tape is then deposited in a roll-to-roll process on top of the conductive polymer. In a further step the silanized protection layer is detached from the transfer glue. Next the other conductive polymer sheet is attached on the other side of the glue grid, forming a mechanically robust three layer structure. To finish the process a self-adhesive layer with a protection sheet is attached to one side of the previously described three layer structures. Along the roll direction one edge is prepared in such a way that it can be electrically contacted. Additional contact pads made of metallic tape with electrically conductive adhesive from 3M can be deposited. The smart label can be customized in size by a simple cutting process (scissors).

Materials

In embodiments, some or all of the conductive or semiconductive layers make use of at least one of the following: organic conductors and organic semiconductors. Conductive polymers include conjugated polymers. Representative conductive polymers include poly(aniline), poly(acetylene), poly(N-vinylcarbazole), poly(pyrrole), poly(thiophene), poly(2-vinylpyridine), poly(p-phenylenevinylene), poly(naphthalene) and related derivatives. Some of the conductors can be formed of carbon fibers and the like, or can incorporate carbon fibers or particles if desired.

What is claimed is:

1. A layer structure comprising:
   a stack of a first, a second and a third layer;
   each of said first and third layers comprising:
   a flexible material that is made of a material selected from a group consisting of:
   an electrically conductive material, and a semiconductive material;
   wherein the second layer comprises a flexible, deformable and compressible material,
   wherein said second layer is electrically less conductive than said first and third layers;
   wherein said second layer is arranged between said first and said third layer; and
   a first electrode arranged on said first layer and a second electrode arranged on said third layer wherein said second layer is a non-conductive spacer grid having air voids.

2. The layer structure according to claim 1, wherein the said first, second and third layers are either one of the following: transparent and semi-transparent.

3. The layer structure according to claim 1 wherein at least one of the first and the third layer further comprises a microstructure so as to obtain a more linear electrical response function with respect to the applied pressure at a touch point.

4. The layer structure according to claim 3,
   wherein said microstructure comprises a pattern of conductive crosses provided on said first layer and a pattern of conductive concentric circles provided on said third layer,
   wherein said microstructure has a higher conductivity than the material of said first layer and said third layer; and
   wherein said pattern of conductive crosses is aligned with said pattern of conductive concentric circles.

5. The layer structure according to claim 1, wherein said first layer comprises at least two electrodes and said second layer comprises at least two electrodes.

6. A layer structure comprising:
   a stack of a first, a second and a third layer;
   each of said first and third layers comprising:
   a flexible material that is selected from a group consisting of: an electrically conductive, and a semiconductive material;
   wherein the second layer comprises a flexible, deformable and compressible material,
   wherein said second layer is electrically less conductive than said first and third layers;
   wherein said second layer is arranged between said first and said third layer; and
   a first electrode arranged on said first layer and a second electrode arranged on said third layer;
   wherein said first and said third layers have anisotropic conductivity such that said first and said third layers have a gradient of increased conductivity in at least one of a vertical and horizontal direction.

7. A smart label, comprising:
   a layer structure; and
   a detector system
   said layer structure comprising:
   a stack of a first, a second and a third layer;
   each of said first and third layers comprising:
   a flexible material that is made of only one of a electrically conductive, and semiconductive material;
   wherein the second layer comprises a flexible, deformable and compressible material,
   wherein said second layer is electrically less conductive than said first and third layers;

wherein said second layer is arranged between said first and said third layer;

a first electrode arranged on said first layer and a second electrode arranged on said third layer;

said detector system comprising:

detecting electronics; and an electrical power supply coupled with said detecting electronics for powering said detecting electronics, wherein at least one of said detecting electronics and said power supply is operatively coupleable with said layer structure;

wherein the application of force on the planar surface of said smart label results in a change in the distance between said first and said third layer and therefore in a corresponding change in the electrical resistance value measurable between said first and second electrodes; and wherein said change in the electrical resistance value is detectable by said detector system.

8. The smart label according to claim 7, further comprising an object, wherein said layer structure is arranged on said object such that a change in the distance between said first and said second layer is obtained by either one of the following:

manipulation of said object; and the application of force on said smart label which in turn causes manipulation of said object.

9. The smart label according to claim 8, wherein said object is a package comprising at least one dispensable and individually packed object.

10. The smart label according to claim 9, wherein said package is a blister package comprising at least one medication unit.

11. The smart label according to claim 9, wherein if the application of force on said smart label results in the dispensing of said at least one individually packed object from said blister package, said dispensing results in a change of the distance between said first and said third layer and therefore in a change of the electrical resistance value measurable across said first and said third layer.

12. The smart label according to claim 9, wherein said detection system detects the position of the dispensed and individually packed object.

13. A method for determining either one or both the position and the pressure applied on layer structure that comprises:

a stack of a first, a second and a third layer;

each of said first and third layers comprising:

a flexible material that is selected from a group consisting of: an electrically conductive material, and a semiconductive material;

wherein the second layer comprises a flexible, deformable and compressible material, wherein said second layer is electrically less conductive than said first and third layers;

wherein said second layer is arranged between said first and said third layer;

said layer structure further comprising:

a first electrode arranged on said first layer and a second electrode arranged on said third layer; and wherein said method comprises applying a force on the planar surface of said smart label;

determining the change of the electrical resistance value measurable between said first and second electrode, wherein said change corresponds in a change of the distance between said first and said third layer; and determining, based on the change in the analog resistance signal measured between said first and said second electrode, either one or both of the following: the position, and the pressure applied on said layer structure.

14. The layer structure according to claim 6, wherein said first and said third layers have a gradient of increased conductivity the further away from said first and said second electrode.

15. A smart label, comprising:

a layer structure according to claim 6; and a detector system comprising:

detecting electronics; and an electrical power supply coupled with said detecting electronics for powering said detecting electronics, wherein at least one of said detecting electronics and said power supply is operatively coupleable with said layer structure;

wherein the application of force on the planar surface of said smart label results in a change in the distance between said first and said third layer and therefore in a corresponding change in the electrical resistance value measurable between said first and second electrode; and wherein said change in the electrical resistance value is detectable by said detector system.

16. A smart label, comprising:

a layer structure according to claim 1; and a detector system comprising:

detecting electronics; and an electrical power supply coupled with said detecting electronics for powering said detecting electronics, wherein at least one of said detecting electronics and said power supply is operatively coupleable with said layer structure;

wherein the application of force on the planar surface of said smart label results in a change in the distance between said first and said third layer and therefore in a corresponding change in the electrical resistance value measurable between said first and second electrode; and wherein said change in the electrical resistance value is detectable by said detector system.

* * * * *

UNITED STATES PATENT AND TRADEMARK OFFICE
CERTIFICATE OF CORRECTION

PATENT NO. : 8,448,530 B2
APPLICATION NO. : 12/732600
DATED : May 28, 2013
INVENTOR(S) : David Leuenberger et al.

Page 1 of 1

It is certified that error appears in the above-identified patent and that said Letters Patent is hereby corrected as shown below:

In the Specification

Column 9, line 55, "know potential" should read --known potential--

Column 14, line 34, "short comings" should read --shortcomings--

Column 15, line 11, "wise versa" should read --vice versa--

Signed and Sealed this
Twenty-third Day of July, 2013

Teresa Stanek Rea
*Acting Director of the United States Patent and Trademark Office*